(12) United States Patent
Chambers et al.

(10) Patent No.: US 11,070,038 B2
(45) Date of Patent: Jul. 20, 2021

(54) CABINET SYSTEM

(71) Applicant: Rev-A-Shelf Company, LLC, Louisville, KY (US)

(72) Inventors: Paul Franklin Chambers, Louisville, KY (US); Kevin M. Ward, Louisville, KY (US); Lauren Klaire Wilson, Goshen, KY (US); Leeman Elliot Stevens, Shelbyville, KY (US)

(73) Assignee: REV-A-SHELF COMPANY, LLC, Louisville, KY (US)

( * ) Notice: Subject to any disclaimer, the term of this patent is extended or adjusted under 35 U.S.C. 154(b) by 62 days.

(21) Appl. No.: 16/422,238

(22) Filed: May 24, 2019

(65) Prior Publication Data

US 2020/0373743 A1     Nov. 26, 2020

(51) Int. Cl.
| | |
|---|---|
| *H02B 1/32* | (2006.01) |
| *A47B 67/04* | (2006.01) |
| *A47B 88/40* | (2017.01) |
| *H01R 13/52* | (2006.01) |
| *H02B 1/38* | (2006.01) |
| *A47B 88/919* | (2017.01) |

(52) U.S. Cl.
CPC ............. *H02B 1/32* (2013.01); *A47B 67/04* (2013.01); *A47B 88/40* (2017.01); *A47B 88/919* (2017.01); *H01R 13/5213* (2013.01); *H02B 1/38* (2013.01)

(58) Field of Classification Search
CPC ........ B62B 19/3833; H02B 1/38; H02B 1/32; A47B 88/40; A47B 88/919; A47B 67/04; H02G 3/14
See application file for complete search history.

(56) References Cited

U.S. PATENT DOCUMENTS

| | | | | |
|---|---|---|---|---|
| D277,441 S | * | 2/1985 | Handley | ........................ D28/38 |
| 4,759,341 A | * | 7/1988 | McFarland | ........... F24C 15/168 |
| | | | | 126/339 |
| 4,824,158 A | * | 4/1989 | Peters | ...................... B60R 5/04 |
| | | | | 108/44 |
| 5,794,799 A | * | 8/1998 | Collins | .................... A45D 1/20 |
| | | | | 211/60.1 |
| 5,917,694 A | * | 6/1999 | Denny | .................... A45D 1/00 |
| | | | | 206/372 |
| 5,924,892 A | * | 7/1999 | Ferracina | ............... H01R 13/72 |
| | | | | 439/501 |
| 6,027,190 A | * | 2/2000 | Stewart | .................. A47B 53/00 |
| | | | | 312/201 |

(Continued)

Primary Examiner — Patrick D Hawn
(74) Attorney, Agent, or Firm — Brinks Gilson & Lione

(57) ABSTRACT

A cabinet system may include a storage container mountable in a cabinet to be movable between being extended out of the cabinet, and being disposed inside the cabinet. The system may include a pair of slide members, and a power connection point. The slide members may slidably connect the storage container and the cabinet. The power connection point includes a cover and an electric outlet. The cover is moveable between a closed position where the electric outlet is inaccessible by a power plug, and an open position where the electric outlet is accessible by the power plug. Slidable movement of the storage container to move the power connection point from outside to inside the cabinet is denied due the cover, in the open position, extending away from the storage container.

18 Claims, 6 Drawing Sheets

(56) References Cited

U.S. PATENT DOCUMENTS

| | | | | |
|---|---|---|---|---|
| 6,591,952 | B1* | 7/2003 | Randall | A45D 44/02 191/12.4 |
| 6,769,554 | B1* | 8/2004 | Udofiah | A45D 44/06 211/26.2 |
| 7,306,301 | B2* | 12/2007 | Walburn | A47B 88/42 312/334.27 |
| 7,807,924 | B2* | 10/2010 | Wurzer | H02G 3/0493 174/59 |
| 7,810,890 | B2* | 10/2010 | Klein | A47B 88/483 312/334.33 |
| 8,810,076 | B2* | 8/2014 | Levi | A45D 20/14 307/139 |
| 9,013,071 | B1* | 4/2015 | Levi | A45D 44/02 307/139 |
| 9,136,653 | B2* | 9/2015 | Dickey | H02J 9/00 |
| 9,331,430 | B2* | 5/2016 | Dickey | H02M 7/42 |
| 9,402,472 | B1* | 8/2016 | Levi | A47F 10/00 |
| 9,578,963 | B2* | 2/2017 | Mayer | A47B 63/00 |
| 9,680,292 | B2* | 6/2017 | Wijaya | H02G 3/085 |
| 9,941,642 | B1* | 4/2018 | Waggoner | H01R 24/76 |
| 10,003,159 | B2* | 6/2018 | Dickey | H01R 24/22 |
| 10,413,058 | B2* | 9/2019 | Kuhn | A47B 81/00 |
| 2010/0107548 | A1* | 5/2010 | Vagedes | H02G 3/14 52/716.2 |
| 2011/0062039 | A1* | 3/2011 | Prokop | A45D 44/02 206/373 |
| 2012/0298450 | A1* | 11/2012 | Sanz | A47B 77/04 182/129 |
| 2013/0088134 | A1* | 4/2013 | Varner | A47B 88/44 312/348.1 |
| 2013/0175415 | A1* | 7/2013 | Mathieu | F16M 11/00 248/176.2 |
| 2014/0197121 | A1* | 7/2014 | Knight | A47B 88/407 211/86.01 |
| 2015/0109720 | A1* | 4/2015 | Esfandiari | H01R 13/72 361/622 |
| 2015/0378597 | A1* | 12/2015 | Renan | G06F 3/04886 715/771 |
| 2016/0033730 | A1* | 2/2016 | Vastmans | G02B 6/4448 385/135 |
| 2017/0099945 | A1* | 4/2017 | Meads | A47B 67/005 |
| 2017/0250509 | A1* | 8/2017 | Swanson | H01R 13/72 |
| 2018/0310711 | A1* | 11/2018 | Kuhn | A47B 88/407 |
| 2019/0098996 | A1* | 4/2019 | Kuhn | A47B 88/90 |
| 2020/0244056 | A1* | 7/2020 | Ustianowski | H05K 7/1417 |

* cited by examiner

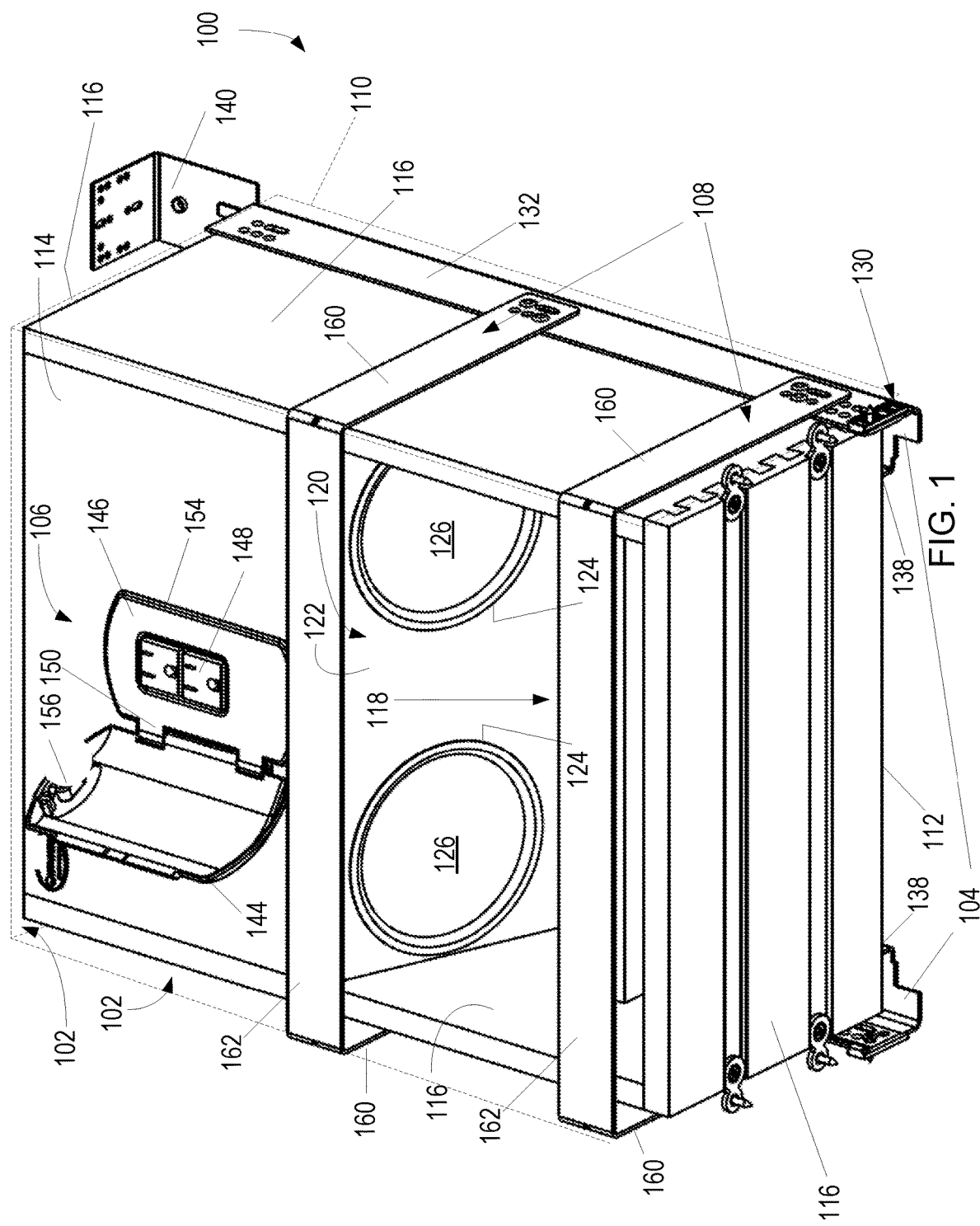

CABINET SYSTEM

FIELD

The present disclosure relates generally to a cabinet system for use in a cabinet or other enclosure.

BACKGROUND

Cabinets such as storage cabinets for kitchens, bathrooms, closets, offices and other uses can include one or more receptacles, such as drawers or shelves for storing articles. The drawers and shelves can be designed to be moved between an open position and a closed position. While in the open position, a drawer or shelf may be extended away from the storage cabinet or other enclosure so as to receive the articles. In the closed position, the drawer or shelf may be recessed within the storage cabinet or other enclosure in which the drawer or shelve is installed. The size and weight of such drawers or shelves can vary. In addition, the weight and/or number of articles that can be stored on the drawers or shelves can be quite different in different applications.

SUMMARY

Further areas of applicability will become apparent from the description provided herein. It should be understood that the description and specific examples are intended for purposes of illustration only and are not intended to limit the scope of the present disclosure.

An example cabinet system includes a storage container, a power connection point and a slide. The storage container may include a base, a top, and a plurality of walls extending perpendicularly between the base and the top. The power connection point may be included in the top or one of the walls and includes a power outlet and a cover. The slide may be coupled to the storage container proximate the base. The slide may be configured to slidably couple the storage container within a cavity of a cabinet in which the storage container is mountable. The storage container may horizontally move, using the slide, between a first position where the power connection point is positioned within the cavity and a second position where the power connection point is outside the cavity. The cover, when in an open position, precludes the power connection point from slidable entry into the cavity due to the cover extending away from the storage container.

Another example cabinet system includes a pair of slide members and a storage container. The storage container may include a first flat planar member, and opposing sidewalls coupled with, and extending perpendicularly away from, the first flat planar member to couple with a second flat planar member. The first flat planar member being parallel to the second flat planar member, and the pair of slide members being coupled to the opposing sidewalls proximate the first planar member.

The cabinet system may also include a power connection point. The power connection point may be mounted in the second flat planar member, or either of the opposing members, and include a power outlet and a cover. The cover, in an open position, may be configured to arrest slidable movement of the storage container on the pair of slide members into a cavity of a cabinet in which the storage container is mounted. When the cover is in the open position, the power outlet is exposed and accessible as a source of electric power.

An interesting feature of the cabinet system is a bracket, which may be fixedly positioned within the cavity of a cabinet to align with the storage container such that the cover, when in a closed position, is spaced away from the bracket, and the cover, when in an open position, precludes the power connection point from slidable entry into the cavity due to the cover contacting the bracket.

Another interesting feature of the cabinet system is that the storage container is coupled with a slidable portion of the slide and the bracket is coupled with a fixed portion of the slide.

Yet another interesting feature of the cabinet system relates to the power connection point being mounted anywhere in the top or either of the opposing sides such that slidable movement of the storage container on the pair of slide members is arrested when the cover is in an open position. In some examples, the base and the top including planar surfaces positioned in parallel planes, and the planar surface of the base is a same width and a longer length than the planar surface of the top. The opposing sides may include planar surfaces positioned in parallel planes spaced apart by the width of the top and/or the base.

Still another interesting feature of the cabinet system relates to the cover of the power connection point. In example configurations where the cover is positioned proximate an edge of the top or one of the opposing sides, the cover may slide between an open and a closed position such that in the open position the cover may interfere with the bracket, or a cabinet in which the cabinet system is installed, to arrest slidable movement of the storage container. The cover may be slidable between the open and the closed position along the planar surface of the top or one of the opposing sides where the power connection point is mounted. When the cover is slid to the open position, the cover may extend away from the storage container beyond the bracket or a peripheral edge of the cabinet defining an aperture through which the storage container may move into and out of the cabinet.

Yet another interesting feature of the cabinet system relates to the cover of the power connection point being hinged, or otherwise pivotable, to pivot about an edge or surface of the cover to move the cover between an open and a closed position. In this example pivotable configuration, the cover, in the open position, interferes with the bracket or the peripheral edge of the cabinet defining the aperture to arrest slidable movement of the storage container.

Still another interesting feature relates to the slidable movement of the storage container on the pair of slide members, which is not impeded by the bracket, or the peripheral edge of the cabinet defining the aperture, when the slidable or pivotable cover is in a closed position such that the power outlet is hidden and unavailable as a source of electric power.

Other systems, methods, features and advantages will be, or will become, apparent to one with skill in the art upon examination of the following figures and detailed description. It is intended that all such additional systems, methods, features and advantages be included within this description, be within the scope of the invention, and the following claims.

DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 1 is a top right perspective view illustrating an example cabinet system.

The drawings described herein are for illustration purposes only and are not intended to limit the scope of the present disclosure in any way.

Figure 5:
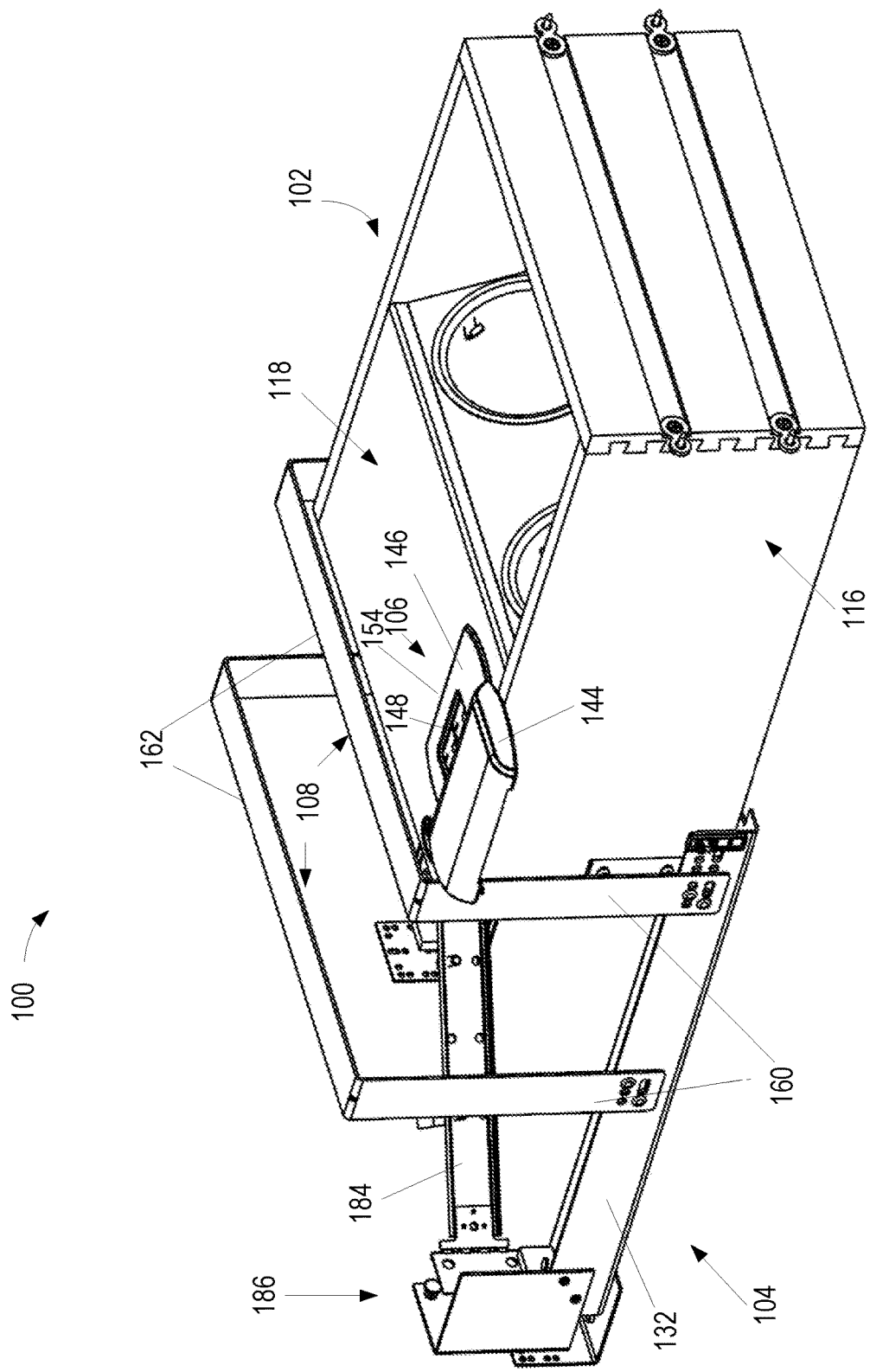

FIG. 5 is a top left perspective view illustrating an example cabinet system with a power connection point positioned in a top of a storage container.

Figure 6:
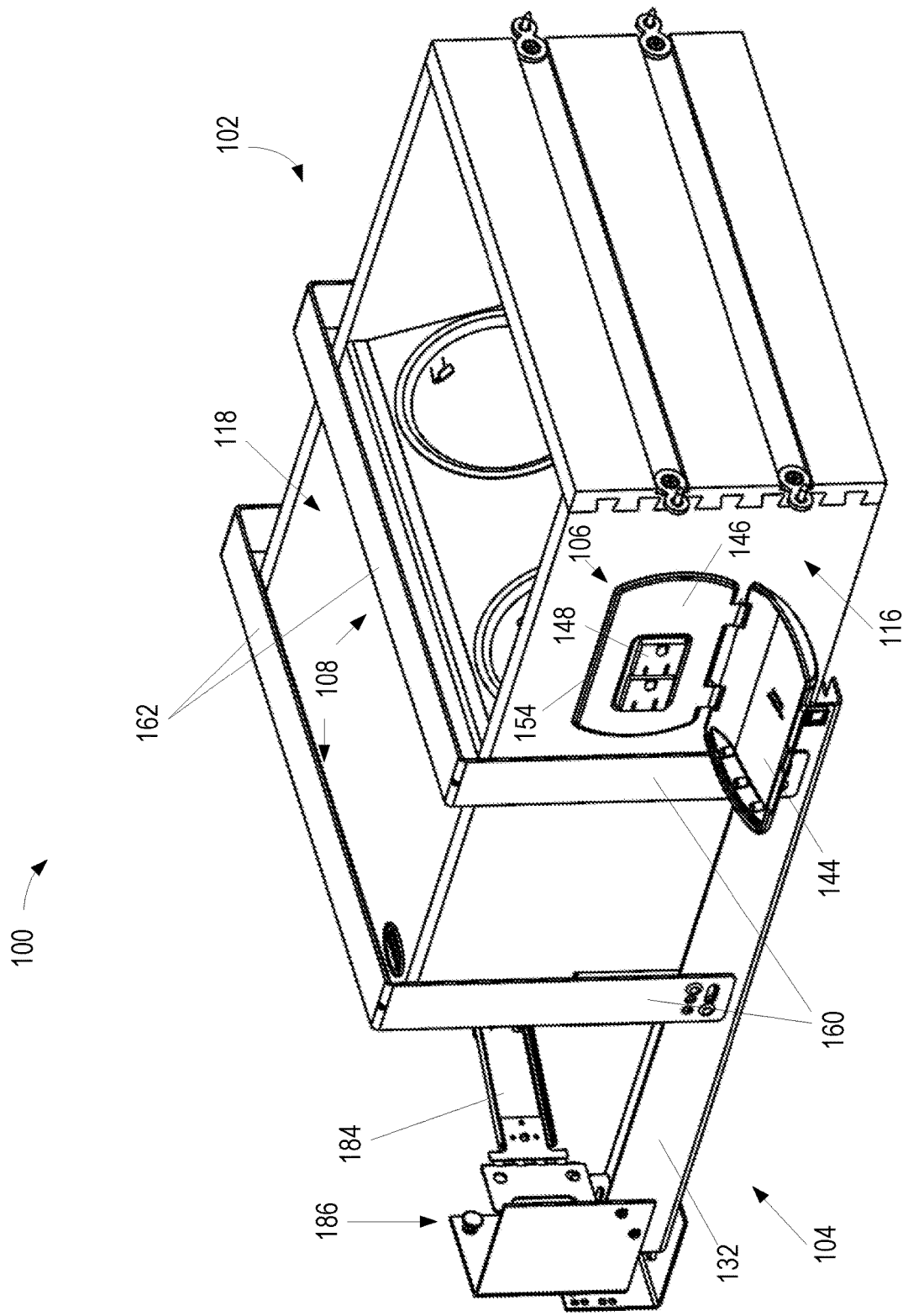

FIG. 6 is a top left perspective view illustrating an example cabinet system with a power connection point positioned in a sidewall of a storage container.

DETAILED DESCRIPTION

The following description is merely exemplary in nature and is not intended to limit the present disclosure, application, or uses.

FIG. 1 is a perspective view of an example cabinet system 100. The cabinet system 100 includes a storage container 102 and telescoping pair of slide members 104, and a power connection point 106. The cabinet system 100, in some examples, may also include at least one bracket 108. The storage container 102 may be mounted in a cavity of a cabinet 110 so as to be movable between a first position where the storage container 102 extends out of the cabinet 110, and a second position where the storage container 102 is at least partially disposed inside the cavity within the cabinet 110 as illustrated in FIG. 1. The cabinet 110 may be an enclosure, such as a kitchen or bath cupboard, a dresser, a frame, a shelf, a trunk, an armoire or any other structure having a built in or standalone chassis in which the storage container may be slidably mounted and should not be construed as limited to the dotted lines illustrated in FIG. 1.

The storage container 102 may include a base 112, a top 114, and walls 116 extending perpendicularly between the base 112 and the top 114 such that the top 114 is in a plane parallel with the base 112. In the example of FIG. 1, the storage container 102 is a rectangular shaped box formed with four walls 116 coupled with the base 112 to form a compartment 118 that is partially covered by the top 114. In other examples, the top 114 may be omitted. The base 112 may be a flat planar member arranged in parallel with the top 114, which may also be a flat planar member. In the example of FIG. 1, the top 114 is coupled with three of the four opposing walls 116 such that an egress 120 into the compartment 118 is defined to provide access thereto. In other words, in the illustrated example, the base 112 and top 114 planar surfaces are positioned in parallel planes where the planar surface of the base 112 is the same width and a longer length than the planar surface of the top 114. In examples where the top 114 is omitted, the egress 120 may be defined by the opposing side walls 116.

In the example of FIG. 1, the storage container 102 may be a drawer in which articles are stored. The illustrated storage container 102 is not meant to limit the form and/or shape of the storage container 102, which can be any rigid material, such as a rigid planar material, for example wood, metal or plastic, or another form of rigid structure or semi-rigid material, such as wire or mesh, and can be formed in any shape, such as circular, rectangular, square, oval, triangular, or any other one or more shapes. The storage container 102 may include an interior vertical wall 122, which is coupled with the base 112 and extends to the top 114. In other examples, the interior vertical wall 122 may be omitted.

In examples that include the top 114 and the interior vertical wall 122, the top 114 may form a shelf in a plane parallel with the base 112, which is coupled to the upper end of the walls 116 and is also coupled to the interior vertical wall 122. In example configurations, the interior vertical wall 122 may include one or more apertures 124 formed therein. In other examples, other features such as hooks, organizer cavities, and the like may be included in the vertical wall 122 to allow a user to arrange contents stored within the system 100. In the illustrated example, the interior vertical wall 122 may be angled so as to be non-perpendicular with respect to the base 112 and the top 114. The apertures 124 may be sized to receive an organizer 126, such as a plastic or metal container, in which articles, such as curling irons, hair dryers and the like may be stored. In other examples, other forms of organizers may be used in the storage container 102, and may be attached, installed, formed, or otherwise mounted on a surface of the interior vertical wall 122. In addition or alternatively, the organizer(s) may be positioned anywhere else in the cabinet system 100. In still other examples, the interior vertical wall 122 may be omitted, or duplicated, and/or the top 114 may not be coupled thereto.

The pair of slide members 104 may be configured to fixedly couple to the cabinet 110 and fixedly couple to the storage container 102 in order to slidably engage the storage container 102 and the cabinet 110. The telescoping slide members 104 each include a slideable portion 130 and a fixed base portion 132. The slideable portion 130 includes a slide bracket 138, which is configured to be fixedly coupled with the bottom of the storage container 102 adjacent the base 112 using fasteners such as screws or rivets. The fixed base portion 132 may include a fixed bracket 140 which is available for fixed coupling to a cabinet 110 so as to slidably couple the storage container 102 within a cavity of the cabinet 110 in which the storage container 102 is mountable. Thus, the slidable portion 130 and the storage container 102 are movable together out of the cavity of the cabinet 110 to be extended away from the fixed base portion 132.

The power connection point 106 may be coupled with the storage container 102, by, for example, fasteners, adhesive, clamps, friction fit, or the like. The power connection point 106 may include a cover 144 and a body 146 with an electric outlet 148 mounted therein. In the illustrated example, cover 144 may be coupled with the body 146 by a hinge 150, such that the cover 144 is moveable between a closed position where the electric outlet 148 is not accessible by a power plug (not shown), and an open position, or transverse position, where the electric outlet 148 is accessible by a power plug. Thus, the cover 144 may be moved between the closed position where the power outlet 148 is concealed due to the cover 144 overlapping, covering or otherwise creating a layer upon at least part of the body 146, and the open position where the power outlet 148 is exposed and the cover 144 is spaced away transverse to the body 146. In the example of FIG. 1, the power connection point 106 is mounted in an aperture 154 formed in the flat planar surface of the top 114, and pivots about the hinge 150 between the open and closed positions. In FIG. 1, the cover 144 is illustrated in the open position. When in the closed position, the cover 144 may be positioned in a plane substantially parallel with the flat planar surface of the top 114.

The cover 144 may include a bumper 156. The bumper 156 may prevent potentially damaging impact between the cover 144 and a portion of the cabinet, such as a face of the cabinet, or the bracket 108 when the storage container 100 is slide while the cover 144 is in the open position. The bumper 156 may be formed of a compressible material with memory, such as rubber or plastic. The bumper 156 may be coupled with the cover 144 to create a compressible separation between the cover 144 and other rigid features included in, or proximate the cabinet system. In an example, the bumper may include projections extending through apertures in the cover 144 and fixedly held therein by, for example, friction, fasteners, adhesive and the like. In other examples, the bumper 156 may be omitted. The cover 144 may also include, for example, a latch or other form of actuator mechanism providing a release of the cover 144 from the closed position. In other examples, the latch may provide a friction fit or other form of releasable engagement with the body 146 when the cover 144 is in the closed position.

The bracket 108 (when present) includes symmetrically vertical sections 160 that are respectively coupled with the fixed base portion 132 of the slide members 104 on opposing sides of the storage container 102. The vertical sections 160 may extend along the opposing walls 116 that form sides of the storage container 102. The bracket 108 may also include a horizontal section 162 extending horizontally between the vertical sections 160 so as to be suspended above the storage container 102. The bracket 108 may be a single unitary structure that is circumferentially positioned next to the opposing walls 116 and the top 114. Alternatively, the bracket 108 may include multiple inter-connectable portions. In other examples one or more of the vertical sections 160, and/or the horizontal section 162 may be omitted so long as the bracket 108 is positioned in accordance with the position of the cover 144 of the power connection point 106 so that when the cover 144 is open, the bracket 108 may be in an interfering position to arrest slidable movement of the storage container 102.

In the example of FIG. 1, two of the brackets 108 are illustrated. In other examples, a single bracket 108 or three or more brackets 108 may be present. The bracket 108 may be mounted in the cabinet 110 adjacent to the power connection point 106 such that when the storage container 102 is moved on the slide members 104 from inside the cabinet 110 to outside the cabinet 110, the power connection point 106 passes under the horizontal section 162 and between the vertical sections 160 of the bracket 108. Alternatively, as illustrated in FIG. 1, the brackets 108 may be coupled with the fixed base portion 132 so as to not be slideable and remain within the cabinet 110 as the slideable portion 130 and the storage container 102 are horizontally moved between inside the cabinet 110 and outside the cabinet 110. In other example, the brackets 108 may be omitted.

The brackets 108 may be omitted in cabinet configurations where slideable movement of the storage container 102 from outside to inside the cabinet 110 is precluded by the structure of the cabinet contacting the cover 144 when in the open position. The storage container 102 slides into the cabinet 110 in which it is mounted through an aperture or opening 164 in the cabinet 110. The aperture 164 is defined by peripheral edges of the cabinet 110. In configurations where the bracket is omitted, the size of the aperture 164 may be defined by the peripheral edges, at least in the area of the cover 144, to only allow a closed cover envelope, profile, outline or outer boundary of the storage container 102 to fit through the aperture 164 when the cover 144 is in the closed position.

In the open position the cover 144 extends outside the closed cover envelope and therefore the cover 144 contacts a peripheral edge of the cabinet defining the aperture 164. In an example, when in the open position the cover 144 may contact a portion of the cabinet, such as a face frame of the cabinet 110 when the storage container 102 is slid from outside to inside the cabinet 110, since the cover 144 extends away from the storage container 102 beyond a peripheral edge of the cabinet defining the aperture 164. The resulting contact between the bumper 156 and the cabinet, or the bracket 108, will arrest slidable movement and otherwise not allow the storage container 102 to be further slid into the cabinet until the cover 144 is in the closed position.

Figure 2A:
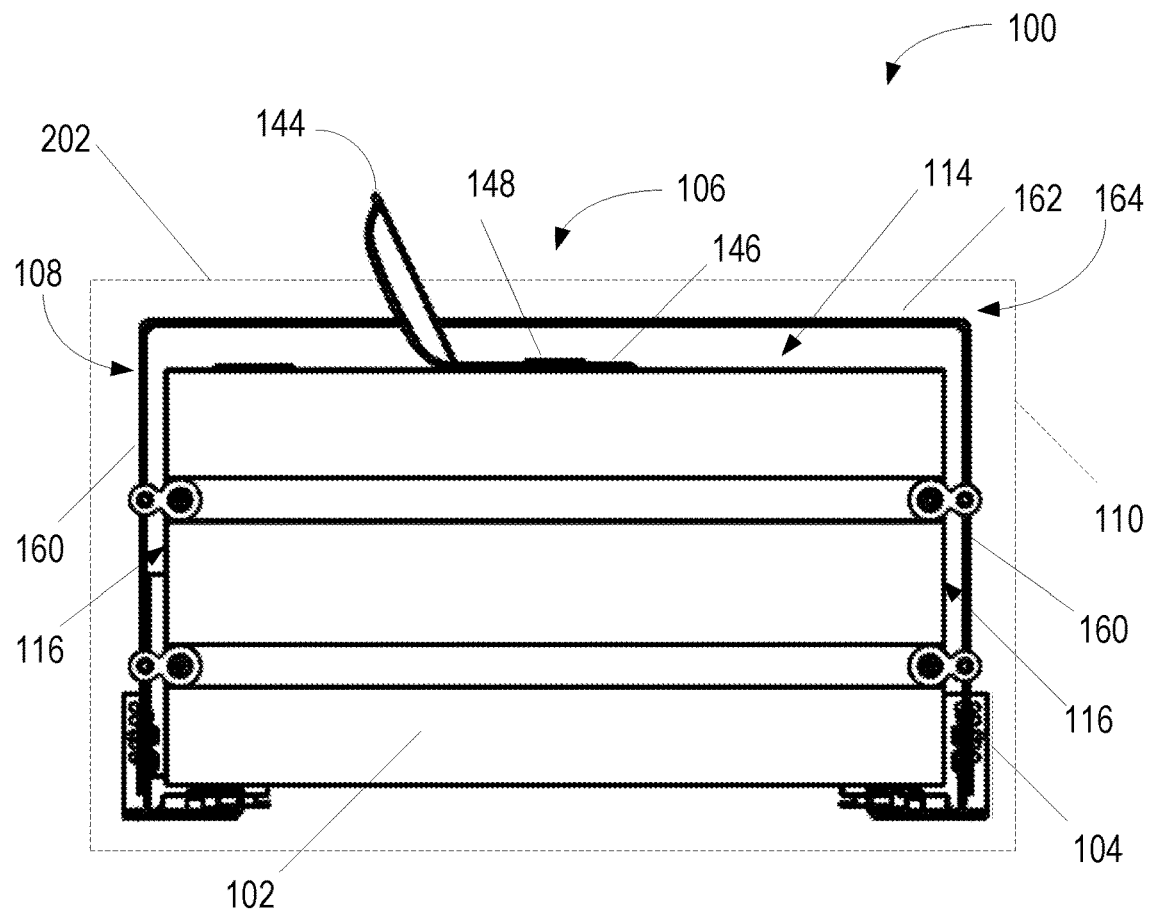
FIG. 2A is a front view of an example cabinet system with a cover of a power connection point in an open position.
Figure 2B:
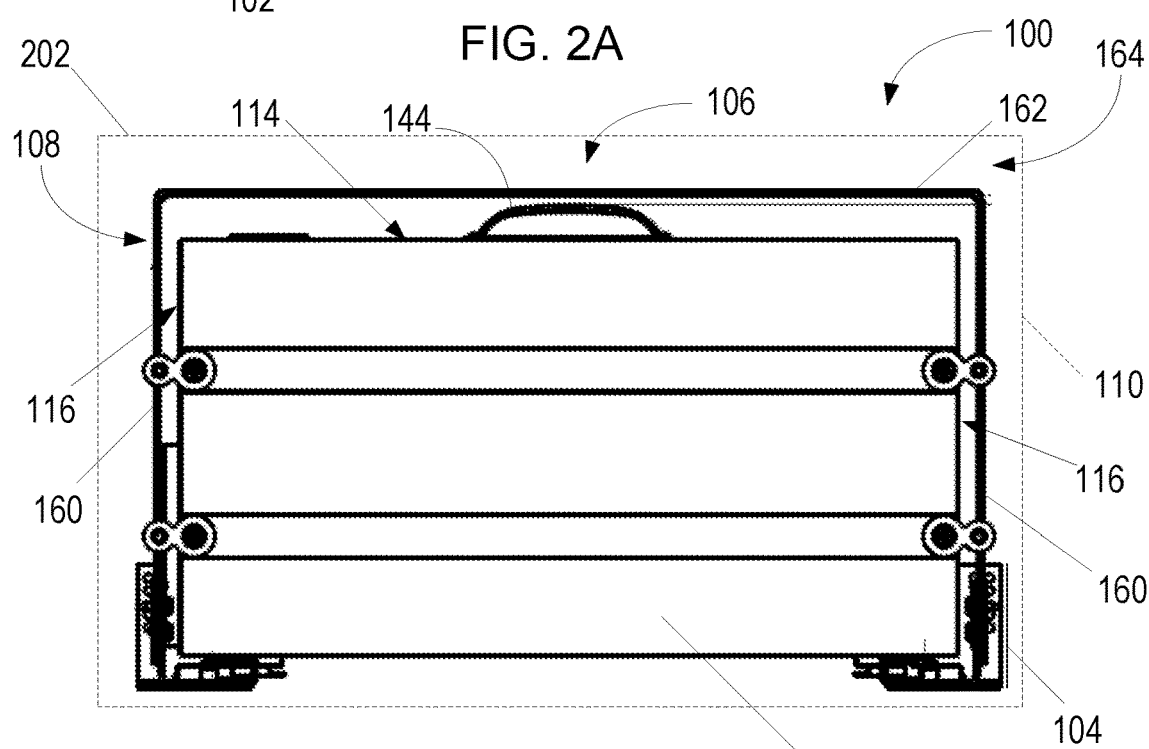
FIG. 2B is a front view of an example cabinet system with a cover of a power connection point in a closed position.

FIGS. 2A and 2B are a front view of an example cabinet system 100. In FIG. 2A, the power connection point 106 is illustrated as being positioned in the top 114 of the storage container 102, with the cover 106 in the open position spaced away from the top 114 of the storage container 102. In other examples, the power connection point 106 may be positioned on one of the walls 116. In FIG. 2B, the power connection point 106 is illustrated with the cover 106 in the closed position in a plane substantially parallel to the top 114. In both FIGS. 2A and 2B, the storage container 102 is illustrated as being in an extended position where the slide members 104 are extended such that the power connection point 106 is outside the cabinet 110 in which the cabinet system 100 is installed. Unless otherwise indicated, the features and functionality of the cabinet system 100 discussed with reference to FIG. 1 are similar. Accordingly, for purposes of brevity the details of these features and functionality will not be fully repeated, and it should be understood that features and functionality are fully interchangeable, combinable, and/or useable in the example systems described herein.

In the example of FIG. 2A, the power connection point 106 is centrally positioned in the top 114 with the cover 144 pivoted into the open position. In this open position, the cover 144 extends above the top 114 a predetermined distance that is outside the closed cover envelope of the storage container 102. For example, where the bracket 108 is present, the cover 144 extends greater than a distance the horizontal section 162 of the bracket 108 is above the top 114. In an example where the bracket 108 is omitted, the cover 144 may extend above a peripheral edge 202 defining a portion of the aperture 164 through which the storage container 102 must pass to slide into the cabinet 110. Accordingly, when the storage container 102 is moved with the slide members 104 while the cover 144 is in the open position, the cover 144 contacts the bracket 108 or the peripheral edge 202. Alternatively, when the cover 144 is in the closed position, as illustrated in FIG. 2B, the cover 144 passes under the bracket 108 or the peripheral edge 202 without contact with the bracket 108 or the peripheral edge 202 since the cover 144 extends above the surface of the top 114 a predetermined distance that is less than a distance to the peripheral edge 202 and/or a distance of the horizontal section 162 of the bracket 108 above the top 114. In an example, clearance between the cover 144 in the closed position and the bracket 108 and/or peripheral edge 202 may be 24.4 mm (one inch) or less.

In an example installation, the cabinet system 100 may be mounted in a cavity within a cabinet 110. The storage container 102 may be moveable between a position within (or at least partially within) the cavity, and a position where the storage container 102 extends on the slide members 104 through the aperture 164 out of the cavity as illustrated in FIGS. 2A and 2B. In this example, when the storage container 102 is positioned within the cabinet 110, the bracket 108 would interfere with moving, such as by pivoting, the cover 144 to the open position. Alternatively, and/or in addition, the cabinet enclosure itself would not allow a user access to the cover 144 when the storage container 102 is positioned in the cabinet 110, or the cabinet 110 would interfere with opening the cover 144. When the storage container 102 is extended out of the cabinet 110 as illustrated, however, the power connection point 106 is outside the cavity, the cover 144 is readily accessible by a user, and moving the cover 144 from the closed position to the open position would encounter no interference by the cabinet 110 or the horizontal section 162 of the bracket 108. Thus, the power outlet 148 is exposed and accessible as a source of electric power only while the storage container 102 is extended out of the cabinet 110.

While extended out of the cabinet 110, a user may plug electrical items, such as a hair dryer or a curling iron into the power outlet 148. However, if the user attempts to move the power connection point 106 from outside the cabinet 110 to inside the cabinet 110 by sliding in the storage container 102 on the slide members 104 without first disconnecting the electrical items, the cover 144 will contact the bracket 108 (or the peripheral edge 202 of the cabinet 110) and stop further horizontal travel of the storage container 102. Accordingly, movement of the storage container 102 from outside to inside the cabinet 110 is denied by the cover 144 contacting the bracket 108 or the peripheral edge 202, such as the face frame, of the cabinet 110 when the cover 144 is in the open position. This cooperative operation of the open cover 144 and the bracket 108 (or peripheral edge of the cabinet) guards against electric items being plugged in when the storage container 102 is inside the cabinet 110. Thus, the possibility of the cabinet containing an electrically power item that remains energized by the electric outlet 148 when the storage container is positioned within the cabinet 110 is eliminated.

Figure 3:
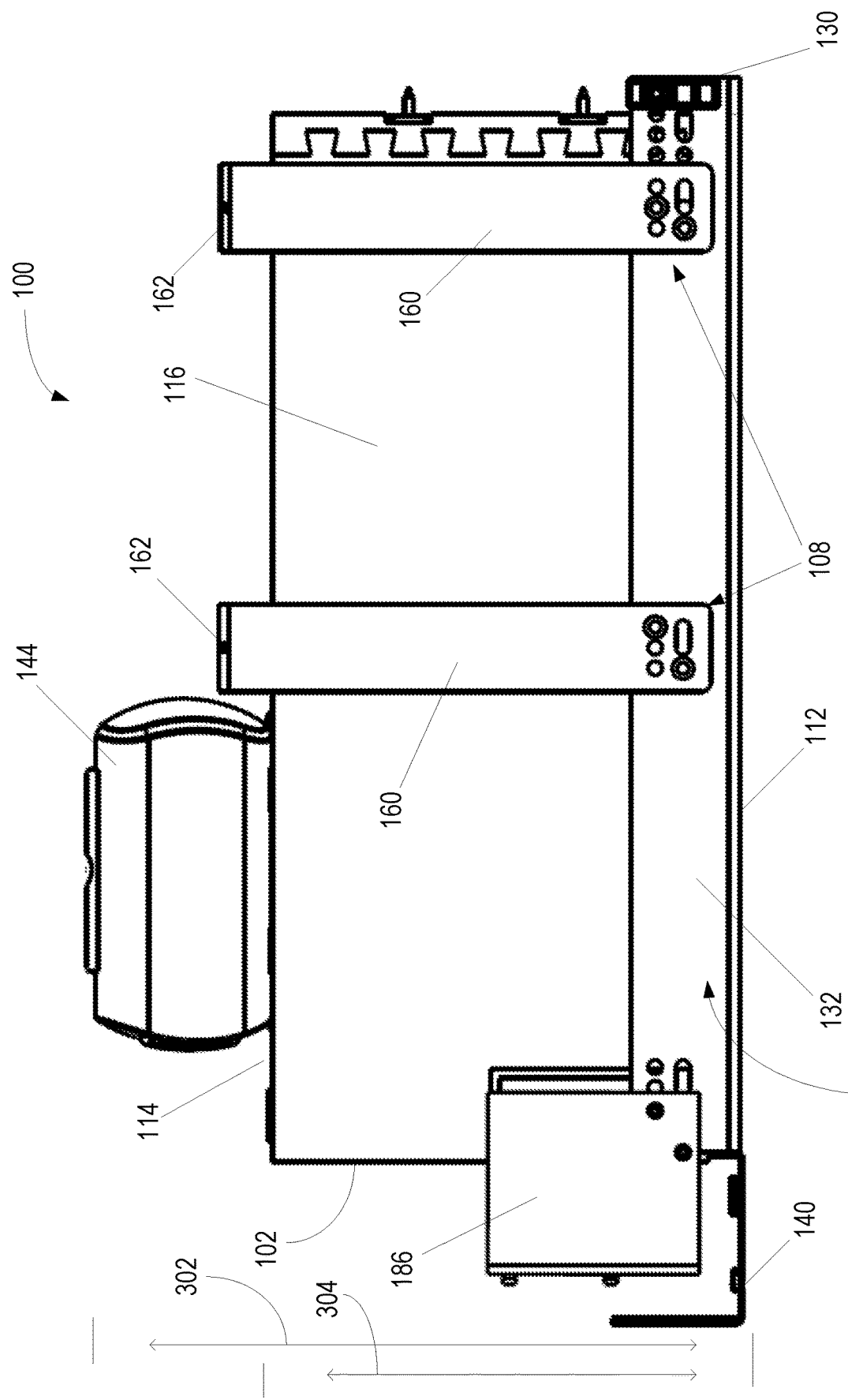
FIG. 3 is a side view of an example cabinet system.

FIG. 3 is a side view of an example cabinet system 100. Unless otherwise indicated, the features and functionality of the cabinet system 100 discussed with reference to FIGS. 1 and 2 are similar. Accordingly, for purposes of brevity the details of these features and functionality will not be fully repeated, and it should be understood that features and functionality are fully interchangeable, combinable, and/or useable in the example systems described herein.

In FIG. 3, the storage container 102 includes the base 112, or bottom, which is a first flat planar member, and opposing sidewalls 116 coupled with, and extending perpendicularly away from, the first flat planar member 112 to couple with the top 114 which is a second flat planar member. The first flat planar member 112 is illustrated as being parallel to the second flat planar member 114. The pair of slide members 104 are coupled to the opposing sidewalls 116 proximate the first planar member 112. The bracket 108 is illustrated as two brackets 108 in FIG. 3, however, in other examples a single bracket 108, or three or more brackets 108 may be included. The bracket 108 includes vertical members 160 coupled at the opposing sidewalls 116 with the fixed base portion 132 of each of the pair of slide members 104 as illustrated in FIG. 3. In other examples, the bracket 108 may be coupled with a cabinet (not shown) in which the cabinet system 100 is installed or any other structure that does not move when the storage container 102 is moved out of the cabinet by sliding along the pair of slide members 104. The bracket 108 may also include one or more vertical members 160 and/or horizontal member 162 coupled between the vertical members 160 to extend horizontally over the second flat planar member 114.

In the example of FIG. 3, the power connection point 106 may be mounted in the second flat planar member 114 as illustrated, or in other examples, in one of the sidewalls 116. The power connection point 106 may include the power outlet and cover 144. The cover 144 is configured to arrest slidable movement of the storage container 102 on the pair of slide members 104 past the vertical or horizontal members 160 or 162 of the bracket 108 (or the cabinet face) when the cover 144 is in the open position such that the power outlet is exposed and accessible as a source of electric power.

In FIG. 3, an open cover envelope 302, which is a profile, outline or outer boundary of the storage container 102 that includes the open cover 144 is shown. Also illustrated in FIG. 3 is a closed cover envelope 304 showing the profile, outline or outer boundary of the storage container 102 when the cover 144 is in the closed position. The open and closed cover envelopes 302 and 304 may also be based on the power connection point 106 being on the side walls 116 in other examples.

Similar to the other examples, slidable movement of the storage container 102 on the pair of slide members 104 is not impeded by the vertical or horizontal members 160 or 162 of the bracket 108 (or the peripheral edge of the cabinet) when the cover 144 is in a closed position such that the power outlet is hidden and unavailable as a source of electric power. In example configurations, that include the bracket 108, the vertical members 160 of the bracket 108 may be coupled with the stationary base 132, and the opposing walls 114 may be coupled with the slidable member 130 such that the storage container 102 is moveable with respect to the bracket 108 and the power connection point 106 may pass under the vertical or horizontal members 160 or 162, so long as the cover 144 is in a closed position. In other examples, where the bracket 108 is omitted, the peripheral edge 202 (FIG. 2) the power connection point 106 may pass under the peripheral edge 202, so long as the cover 144 is in a closed position.

Figure 4:
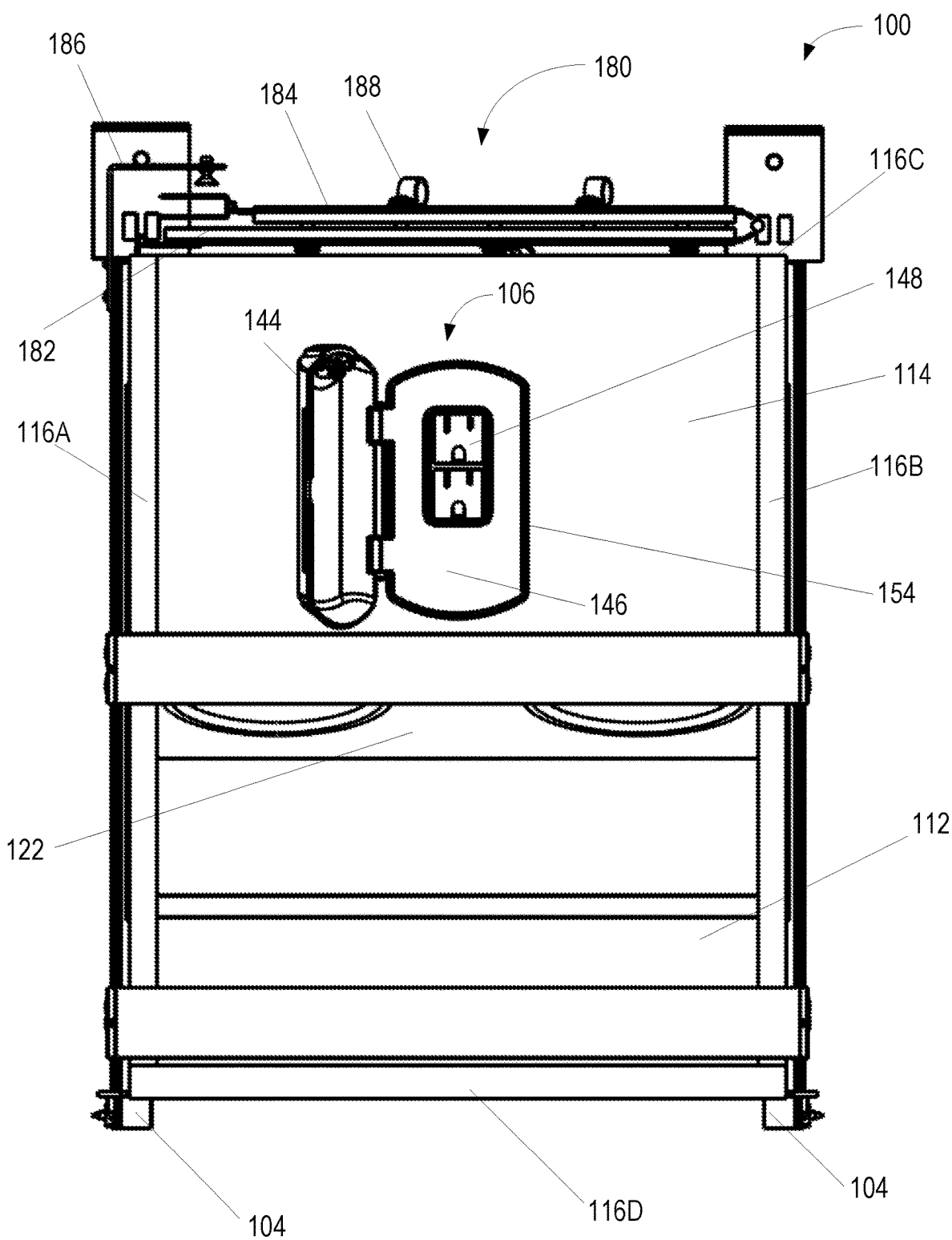
FIG. 4 is a top view of an example cabinet system 100.

FIG. 4 is a top view of an example cabinet system 100. In FIG. 4, the power connection point 106 is centrally mounted in an aperture 154 in the planar surface of the top 114. The top 114 is coupled with the opposing side walls 116A and 116B, the rear wall 116C, and the interior vertical wall 122 opposite the planar surface of the base 112. In other examples, the aperture 154 may be positioned anywhere else in the top 114. In still other examples, aperture 154 may be positioned anywhere in the side walls 116A and/or 116B, and the top 114 may be omitted or positioned differently.

In the illustrated example, the rear wall 116C is opposite the front wall 116D, which is spaced away from the top 114 to create the egress 120 into the compartment 118 defined by the opposing side walls 116A and 116B, the interior vertical wall 122, and the front wall 116D. Unless otherwise indicated, the features and functionality of the cabinet system 100 discussed with reference to FIGS. 1, 2 and 3 are similar. Accordingly, for purposes of brevity the details of these features and functionality will not be fully repeated, and it should be understood that features and functionality are fully interchangeable, combinable, and/or useable in the example systems described herein.

Power may be continuously supplied to the power connection point 106 such that the electric outlet 148 is available to supply power to a device plugged into the electric outlet 148 whenever the cover 144 is in the open position. A continuous supply of power may be provided by a hinged power supply arm 180. The hinged power supply arm 180 may provide a foldable rigid support that includes a first member 182 pivotably coupled with a second member 184. The first member 182 may be pivotably coupled with the storage container 102 at one end, and the second member 184 at the other end. The second member 184 may be pivotably coupled with the first member 182 at one end and configured to be pivotably coupled with a power bracket 186 at the other end. The power bracket 186 may be coupled with the stationary base 132 of one of the pair of slides 104. Thus, the power bracket 186 and the end of the second member 184 pivotably coupled thereto do not move as the storage container 102 is slid horizontally along the pair of slide members 104. In other examples, the power bracket 186 may be coupled with the cabinet or other structure in which the cabinet system 100 is installed. In still other examples, the power bracket 186 may be omitted and the end of the second member may be coupled directly to the slide 104 or the cabinet.

A flexible power cord may be coupled with the hinged power supply arm 180 by keepers 188, such as clamps, tie-wraps, fingers, orifices in the members 182 and 184 and the like. The flexible power cord may be coupled such that the hinged first and second members 182 and 184, and the power cord move together as the storage container 102 is moved horizontally with the pair of slides 104. Thus, binding, fraying, tangling, and the like, of the power cord may be avoided. The power cord may be coupled with a power source at one end, and may enter the storage container 102 through the rear wall 116C. The power source may be, for example, a power box circuit breaker, an outlet, or any other source of power. Once inside the storage container 102, the power cord may be routed to the power connection point 106, where it may be terminated at the power outlet 148.

FIG. 5 is a top left perspective view illustrating an example cabinet system 100 with a power connection point 106 positioned in a top 114 of a storage container 102. In FIG. 5, the power connection point 106 includes a cover 144 that is slidable between an open and a closed positioned. In the illustrated example, the cover 144 is slid to an open position. Accordingly, the outlet 148 is available to receive a power plug. Unless otherwise indicated, the features and functionality of the cabinet system 100 discussed with reference to FIGS. 1, 2, 3 and 4 are similar. Accordingly, for purposes of brevity the details of these features and functionality will not be fully repeated, and it should be understood that features and functionality are fully interchangeable, combinable, and/or useable in the example systems described herein.

Similar to other examples described herein, the cover 144, when in the open position, interferes with the storage container 102 being slidable on the slide members 104 into the cabinet by extending away from the storage container 102 beyond the bracket 108 or a peripheral edge 202 of the cabinet 110 (FIG. 2). In the illustrated example, power connection point 106 is positioned in an aperture 154 proximate an edge of the top 118, and the cover 144 is slidable along the planar surface of the top 118 between the open and closed positions. The cover 144 is slidable to be positioned away from the body 146 when opened and extends past the edge of the top 118 so as to contact the vertical member 160 of the bracket 108 (or a peripheral edge of the cabinet) when the storage container 102 is slid. When in the closed position, the cover 144 does not extend past the edge of the top 118, and does not deny slidable operation of the storage container 102. In addition, the cover 144 when in the closed position provides a layer above the body 146 so that the outlet 148 is no longer accessible.

In the example of FIG. 5, the power connection point 106 is positioned in the top 118 proximate an edge of the sidewall 116 and an edge of the top 118, with the cover 144 pivoted into the open position. In this open position, the cover 144 extends away from the storage container 102 a predetermined distance that is greater than a distance the vertical section 160 of the bracket 108 is separated away from the storage container 102, or a distance a peripheral edge of the cabinet is separated away from the storage container 102. Accordingly, when the storage container 102 is moved with the slide members 104 while the cover 144 is in the open position, the cover 144 contacts the bracket 108 (or the peripheral edge of the cabinet, such as the face frame of the cabinet). Alternatively, when the cover 144 is in the closed position, the cover 144 passes beside the vertical section 160 and under the horizontal section 162 of the bracket 108 without contact with the bracket 108, or passes beside the peripheral edge of the cabinet without contacting the peripheral edge, such as the face frame of the cabinet, since the cover 144, in the closed position, does not extend away from the storage container 102 beyond the bracket 108 or peripheral edge 202 (FIG. 2). In the illustrated example, the cover 144 does not extend further than a distance of the vertical section 160 of the bracket 108, or the peripheral edge, from the sidewall 116. In an example, clearance between the cover 144 in the closed position and the bracket 108 or peripheral edge may be 24.4 mm (one inch) or less.

In another example, where the power connection point 106 is positioned in the sidewall 116 proximate an edge of the sidewall 116 and the top 118, when the storage container 102 is moved with the slide members 104 while the cover 144 is slid into the open position, the cover 144 contacts horizontal section 162 of the bracket 108 (or peripheral edge of the cabinet) to deny the storage container 102 being slid into the cabinet.

FIG. 6 is a top left perspective view illustrating an example cabinet system 100 with a power connection point 106 positioned in a sidewall 116 of a storage container 102. In FIG. 6, the power connection point 106 is positioned in an aperture 154 in the side wall 116 and the storage container 102 is slidably extended on a pair of slides 104. The cover 144 of the power connection point 106 is illustrated as pivotable and in the open position such that slidable travel of the storage container 102 into a cabinet would be denied by the cover 154 contacting the vertical member 160 of the bracket 108 or the peripheral edge of an aperture formed in the cabinet. In this example, the aperture 154 and the power connection point 106 positioned therein may be positioned anywhere in the sidewall 116 and the cover 144 is pivotable between the open and closed positions. In other examples, the power connection point 106 may be proximate an edge of the sidewall 116, and the cover 144 may be slidable along the planar surface of the sidewall 116 between the open position, where the cover 144 may contact the horizontal portion 162 of the bracket 108 or the peripheral edge, and the closed position where the cover 144 is a layer over the body 146. Unless otherwise indicated, the features and functionality of the cabinet system 100 discussed with reference to FIGS. 1, 2, 3, 4 and 5 are similar. Accordingly, for purposes of brevity the details of these features and functionality will not be fully repeated, and it should be understood that features and functionality are fully interchangeable, combinable, and/or useable in the example systems described herein.

It is now apparent that there are many advantages of the cabinet system provided herein. In addition to the advantages that have been described, it is also possible that there are still other advantages that are not currently recognized but which may become apparent at a later time.

While preferred embodiments of the cabinet system have been described, it should be understood that the disclosure is not limiting, and modifications may be made without departing from the features and functionality described. The scope of the disclosure is defined by the appended claims, and all devices that come within the meaning of the claims, either literally or by equivalence, are intended to embrace them.

What is claimed is:

1. A cabinet system comprising:
a storage container mountable in a cavity of a cabinet to be movable between a first position where the storage container extends out of the cavity through an aperture of the cabinet, and a second position where the storage container is at least partially disposed inside the cabinet, wherein the storage container includes a base, a plurality of walls and a top, the walls coupled with the base proximate a first end of the walls and vertically extending perpendicular to the base to a second end of the walls, the top coupled with the walls proximate the second end such that a flat planar surface of the top is in a plane parallel with the base;
a pair of horizontal slide members configured to fixedly couple with the cabinet and the storage container and slidably connect the storage container and the cabinet;
a power connection point mounted in the flat planar surface of the top or a flat planar surface of one of the walls;
the power connection point comprising a cover and an electric outlet, the cover moveable between a closed position where the electric outlet is inaccessible by a power plug, and an open position where the electric outlet is accessible by the power plug; and
a bracket comprising symmetrical vertical sections respectively coupled with the pair of horizontal slide members, and a horizontal section extending horizontally between the vertical sections above the storage container,
wherein slidable movement of the storage container to move the power connection point from outside to inside the cabinet is denied due to the cover, in the open position, extending away from the storage container a predetermined distance greater than a distance between the storage container and the bracket.

2. The cabinet system of claim 1, wherein the pair of slide members are coupled adjacent a bottom of the storage container.

3. The cabinet system of claim 1, wherein the power connection point is positioned on the top or one or more of the walls such that the cover, in the open position, extends outside a closed cover envelope of the storage container and the aperture of the cabinet through which the storage container moves.

4. The cabinet system of claim 1, wherein the bracket is a plurality of brackets coupled sequentially along the horizontal slide members proximate the power connection point so that the cover only extends beyond the brackets to the open position when the power connection point is spaced away from the brackets.

5. The cabinet system of claim 1, wherein the bracket is a single unitary structure circumferentially positioned parallel to the walls and the top.

6. The cabinet system of claim 1, wherein the bracket is coupled with each slide included in the pair of slide members to extend along opposing sides of the storage container and above the storage container a predetermined distance that is less than a width of the cover.

7. A cabinet system comprising:
a storage container, the storage container comprising a base and a plurality of sidewalls extending perpendicularly from the base to a shelf of the storage container, the shelf and the sidewalls each comprising a flat planar surface;
a power connection point coupled with the storage container in the flat planar surface of the shelf or one of the sidewalls, the power connection point including a power outlet and a cover, wherein the cover of the power connection point pivots with respect to the flat planar surface or slides along the flat planar surface of the shelf or one of the sidewalls between a closed position where the power outlet is enclosed within the storage container by the cover and an open position where the power outlet is exposed;
a slide coupled to the storage container proximate the base and configured to slidably couple the storage container within a cavity of a cabinet in which the storage container is mountable, the storage container horizontally slidable with the slide between a first position where the power connection point is positioned within the cavity and a second position where the power connection point is outside the cavity, wherein the cover, in an open position, precludes the power connection point from slidable entry into the cavity due to the cover extending away from the storage container; and
a bracket fixedly positioned within the cavity, the bracket formed with a vertical section extending along the sidewalls and a horizontal section perpendicular to the vertical section and extending horizontally above the shelf.

8. The cabinet system of claim 7, wherein the power connection point comprises a hinge to pivot the cover between the closed position where the power outlet is concealed and the open position where the power outlet is exposed.

9. The cabinet system of claim 7, wherein the cover of the power connection point is slidable along the flat planar surface of the shelf or one of the sidewalls between the closed position where the cover is on the flat planar surface and the power outlet is concealed, and the open position where the cover extends beyond a peripheral edge of the storage container and the power outlet is exposed.

10. The cabinet system of claim 7, wherein the cover, in the closed position, extends above the flat planar surface of the shelf or one of the sidewalls a predetermined distance that is less than a distance between the storage container and a peripheral edge of the cabinet defining an entry aperture into the cavity.

11. The cabinet system of claim 7, wherein the bracket aligns with the storage container such that the cover, when in a closed position, is spaced away from the bracket, and the cover, when in an open position, precludes the power connection point from slidable entry into the cavity due to the cover extending away from the storage container beyond the bracket.

12. The cabinet system of claim 11, wherein the slide comprises a fixed portion and a slidable portion, and wherein the storage container is coupled with the slidable portion, and the bracket is coupled with the fixed portion.

13. The cabinet system of claim 11, wherein the cover, in the open position, extends above the flat planar surface of the shelf or one of the sidewalls a predetermined distance that is greater than a distance between the bracket and the storage container.

14. A cabinet system comprising:
a pair of horizontal slide members;
a storage container having a first flat planar member, and opposing sidewalls coupled with, and extending perpendicularly away from, the first flat planar member to couple with a second flat planar member, the first flat planar member being parallel to the second flat planar member, and the pair of slide members being coupled to the opposing sidewalls proximate the first planar member; and
a power connection point mounted in an aperture in the second flat planar member or one of the opposing sidewalls, the power connection point including a power outlet and a cover, the cover, in an open position, configured to arrest slidable horizontal movement of the storage container, on the pair of horizontal slide members; into a cavity of a cabinet in which the storage container is mounted, the power outlet being exposed and accessible as a source of electric power when the cover is in the open position;
a bracket positioned to align in parallel with at least part of the second flat planar member, the opposing sidewalls or both the second flat planar member and the opposing sidewalls; and
a bumper coupled with the cover, the bumper comprising a compressible material aligned to contact the bracket or the cabinet when the cover is in the open position and the storage container is slid horizontally with the pair of horizontal slide members.

15. The cabinet system of claim 14, wherein slidable horizontal movement of the storage container on the pair of horizontal slide members is not impeded when the cover is in a closed position such that the power outlet is hidden and unavailable as a source of electric power.

16. The cabinet system of claim 14, a wherein the bracket includes vertical members coupled with the pair of horizontal slide members at the opposing sidewalls and a horizontal member coupled between the vertical members to extend horizontally over the second flat planar member.

17. The cabinet system of claim 16, wherein the pair of horizontal slide members each include a stationary base and a horizontally slidable member movably engaged with the stationary base, the vertical members of the bracket coupled with the stationary base, and the opposing sidewalls being coupled with the horizontally slidable member such that the storage container is horizontally moveable with respect to the bracket and the power connection point passes under the horizontal member, so long as the cover is in a closed position.

18. The cabinet system of claim 14, wherein the bumper includes projections extending through apertures included in the cover and fixedly held therein by at least one of friction, fasteners, or adhesive.

\* \* \* \* \*